United States Patent
Engelke et al.

(10) Patent No.: US 12,489,839 B2
(45) Date of Patent: Dec. 2, 2025

(54) 911 CALL ASSISTANCE FOR ASSISTED DEVICE USER

(71) Applicant: Ultratec, Inc., Madison, WI (US)

(72) Inventors: Robert M. Engelke, Madison, WI (US); Kevin R. Colwell, Middleton, WI (US); Troy D. Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 31 days.

(21) Appl. No.: 18/503,591

(22) Filed: Nov. 7, 2023

(65) Prior Publication Data
US 2024/0073311 A1 Feb. 29, 2024

Related U.S. Application Data

(63) Continuation of application No. 18/111,695, filed on Feb. 20, 2023, now Pat. No. 11,825,008, which is a continuation of application No. 17/580,332, filed on Jan. 20, 2022, now Pat. No. 11,611,644, which is a continuation of application No. 17/014,763, filed on Sep. 8, 2020, now Pat. No. 11,272,047, which is a continuation of application No. 16/732,894, filed on Jan. 2, 2020, now Pat. No. 10,771,604, which is a continuation of application No. 16/008,683, filed on Jun. 14, 2018, now Pat. No. 10,542,131, which is a continuation of application No. 15/145,449, filed on
(Continued)

(51) Int. Cl.
*H04M 1/247* (2021.01)
*H04M 3/42* (2006.01)
*H04M 3/51* (2006.01)
*H04W 4/16* (2009.01)
*H04W 4/90* (2018.01)

(52) U.S. Cl.
CPC ..... *H04M 1/2475* (2013.01); *H04M 3/42153* (2013.01); *H04M 3/42391* (2013.01); *H04M 3/5116* (2013.01); *H04W 4/16* (2013.01); *H04W 4/90* (2018.02); *H04M 2203/256* (2013.01)

(58) Field of Classification Search
CPC .......... H04M 3/42391; H04M 1/2475; H04M 1/72591; H04M 2242/04; H04M 3/42153; H04M 3/5116; G08B 25/016; H04W 4/90; H04W 76/50
USPC ...................................... 455/404.1
See application file for complete search history.

(56) References Cited

U.S. PATENT DOCUMENTS 4,850,011 A 7/1989 Delmege et al.
5,659,366 A 8/1997 Kerman
(Continued)

*Primary Examiner* — Maria El-Zoobi
(74) *Attorney, Agent, or Firm* — Quarles & Brady LLP

(57) ABSTRACT

An assisted user's (AU's) captioning device for assisting an AU during a call with a hearing user (HU) wherein the hearing user uses a HU's communication device, the captioning device comprising a display screen and a processor linked to the display screen, the processor programmed to perform the steps of upon receiving a call, automatically determining if the call is from one of a first set of HUs, upon determining that the call is from one of the first set of HUs, automatically initiating captioning and presenting captions of an HU voice signal during at least a portion of the call, and upon determining that the call is not from one of the first set of HUs, starting the call without captioning and providing an option to the AU to initiate captioning during the call.

15 Claims, 5 Drawing Sheets

Related U.S. Application Data

May 3, 2016, now Pat. No. 10,021,229, which is a continuation of application No. 14/571,894, filed on Dec. 16, 2014, now Pat. No. 9,350,857.

(56) References Cited

U.S. PATENT DOCUMENTS

| | | |
|---|---|---|
| 6,603,835 B2 | 8/2003 | Engelke et al. |
| 9,350,857 B1 | 5/2016 | Engelke et al. |
| 9,560,188 B2 | 1/2017 | Kim et al. |
| 10,021,229 B1 | 7/2018 | Engelke et al. |
| 2002/0085685 A1 | 7/2002 | Engelke et al. |
| 2002/0085703 A1 | 7/2002 | Proctor |
| 2006/0098792 A1 | 5/2006 | Frank et al. |
| 2011/0170672 A1 | 7/2011 | Engelke et al. |
| 2014/0153705 A1 | 6/2014 | Moore et al. |
| 2014/0270144 A1 | 9/2014 | Bentley et al. |
| 2014/0314220 A1 | 10/2014 | Charugundla |
| 2014/0364081 A1 | 12/2014 | Rauner |
| 2015/0043572 A1* | 2/2015 | Charugundla ...... H04M 7/0042 370/352 |
| 2015/0094105 A1* | 4/2015 | Pan .................. G10L 15/26 455/466 |
| 2016/0088150 A1* | 3/2016 | Lam ............... H04L 65/1096 370/259 |
| 2016/0100050 A1 | 4/2016 | VanBlon et al. |
| 2020/0366789 A1* | 11/2020 | Patron ............. H04M 3/42391 |

\* cited by examiner

911 CALL ASSISTANCE FOR ASSISTED DEVICE USER

CROSS-REFERENCE TO RELATED APPLICATIONS

This application is a continuation of U.S. patent application Ser. No. 18/111,695, filed on Feb. 20, 2023, which is a continuation of U.S. patent application Ser. No. 17/580,332, filed on Jan. 20, 2022, which is a continuation of U.S. patent application Ser. No. 17/014,763, filed Sep. 8, 2020, which is a continuation of U.S. patent application Ser. No. 16/732,894, filed Jan. 2, 2020, and issued as U.S. Pat. No. 10,771,604 on Sep. 8, 2020, which is a continuation of U.S. patent application Ser. No. 16/008,683, filed Jun. 14, 2018, and issued as U.S. Pat. No. 10,542,131 on Jan. 21, 2020, which is a continuation of U.S. patent application Ser. No. 15/145,449, filed May 3, 2016, and issued as U.S. Pat. No. 10,021,229 on Jul. 10, 2018, which is a continuation of U.S. patent application Ser. No. 14/571,894, filed Dec. 16, 2014, and issued as U.S. Pat. No. 9,350,857 on May 24, 2016. The contents of all the preceding applications listed above are incorporated by reference herein in their entirety and the present application claims priority to each of the above applications.

STATEMENT REGARDING FEDERALLY SPONSORED RESEARCH OR DEVELOPMENT

Not applicable.

BACKGROUND OF THE INVENTION

The present invention relates to communication devices for deaf and hard of hearing or assisted user and more specifically to concepts related to 911 or other types of emergency calls for providing captioning services to assisted communication device users.

Phones have been developed that provide captioning services to deaf or hard of hearing persons (e.g., hereafter "assisted users"). To this end, when a hearing user and an assisted user are participating in a voice telephone call, when the hearing user speaks, the hearing user's voice is transmitted to a remote relay where the hearing user's voice is translated into text. The text is transmitted to the assisted user's device where the text is displayed for the assisted user to view, generally at the same time that the hearing user's voice is broadcast to the assisted user to hear.

Some assisted user devices have been developed that can be used as either a regular telephone without text captioning or as a text captioned phone based on preference of an assisted user. These phones are particularly useful for assisted user's that are not completely deaf and that therefore may want captioning some of the time but not all of the time. For instance, a specific assisted user may be able to hear a first hearing user's voice well but not a second hearing user's voice where the first and second hearing user's have distinctly different tones. Devices that can be used as either regular phones or captioned phones are also particularly useful where one or more non-assisted users live with an assisted user and do not need or desire a captioning service.

One issue that has come up with devices that can optionally be used as conventional telephones as well as captioned devices is that assisted user's desire the ability to turn captioning services on and off during an ongoing voice telephone call with a hearing user. For instance, an assisted user may start a call with captioning initially turned off. During the call, the assisted user may start to have difficulty making out a hearing user's voice and therefore may desire to turn on a captioning service. For this reason devices have been developed that enable an assisted user to turn on captioning during an ongoing voice call. In this regard see U.S. Pat. No. 6,603,835 entitled "System For Text Assisted Telephony" which issued on Aug. 5, 2003 and which is incorporated herein in its entirety by reference.

In addition to providing a solution to a preference of at least some assisted users, the optional captioning feature has reduced the overall cost associated with using relays to provide captioning when needed. To this end, instead of always providing the captioning service, captioning is only provided when needed and affirmatively selected by an assisted user.

In addition to being useful for communicating with hearing users under normal circumstances, assisted user devices are also useful for communicating in emergency situations. For instance, an assisted user device is usable to initiate a 911 emergency call at any time so that an assisted user can receive captioning during an emergency call. In the case of devices usable as both a conventional telephone and optionally as a captioning device, in order to expedite captioning service when an emergency occurs and a 911 call is initiated by an assisted user, devices have routinely been set up to automatically provide captioning upon call initiation instead of requiring an affirmative step to start captioning. Thus, when an assisted user dials 911, captioning is automatically initiated regardless of whether or not the assisted user affirmatively selects captioning.

While automatic captioning upon dialing 911 is useful, unfortunately, in use, this feature can cause some confusion. For instance, for an assisted user that is used to selecting the captioning option each time the assisted user places a non-emergency call, the natural inclination upon placing a 911 call is to select the captioning option after dialing 911 despite the fact that captioning is automatically initiated upon dialing 911. The effect of selecting the captioning button after the automatic initiation of captioning is to turn off captioning, the exact opposite of the user's intention. When captioning goes off instead of on as intended upon assisted user selection, the off state can cause additional confusion for an assisted user and hamper communication during an emergency 911 call.

Often 911 calls are disrupted for various reasons and a connection to complete a call has to be re-established. For this reason, when a 911 call is received by an operator, the operator's communication system typically automatically obtains and stores a call back number for the phone used to initiate the 911 call so that, if premature disconnection occurs, the operator can initiate a call back to the phone used to place the original call.

One other problem associated with 911 calls is that, upon a call back after premature 911 disconnection, an assisted user may become more flustered when the call is answered if the call back is simply treated as a conventional non-emergency telephone call without captioning.

BRIEF SUMMARY OF THE INVENTION

It has been recognized that confusion associated with manual selection of captioning (e.g., a mechanical or virtual caption button) after automatic captioning upon initiating an emergency call can be avoided by, in effect, disregarding any caption controlling selection action for at least a short period after a 911 call is initiated. For instance, upon an assisted user initiating a 911 call captioning may automatically be commenced and a timer may be started to count out a time out period (e.g., 15 seconds). During the time out period, any selection of a caption button or selection tool will not result in any action related to the captioning service. Here, the time out period should be selected to have a duration that is long enough for the assisted user to recognize that the captioning service has been activated. At the end of the timeout period, in at least some embodiments, the assisted user or another user may select the caption button, if desired, to turn off the caption service or may choose to allow the service to continue.

In some embodiments, in addition to effectively disabling the caption button from being used to discontinue captioning during the time out period, a processor in the assisted user device may be programmed to provide a message via a display screen and/or to audibly indicate to the assisted user or another person near the assisted user device that captioning is on. When the message is provided via display, the message may either be presented immediately when a 911 call is commenced or only after a 911 call is commenced and the caption button has been selected. The message may only persist for a portion of the duration of the time out period or may persist for the entire duration of the period. The message may simply indicate that captioning is on or may include additional information such as a timer counting down the duration of the time out period or further instructions that the time out period will end shortly at which point captioning can be turned off if the user so desires.

In some embodiments captioning may be automatically turned on and left on at all times during a 911 call without the ability to turn captioning off. In this case a message may be provided to the device user that captioning will remain on during the entire 911 call irrespective of selection of the caption button.

In at least some embodiments appearance of a caption button may be altered to indicate whether or not selection of the button will affect captioning during a 911 call. For instance, a caption button may be back illuminated using a white colored LED to indicate that captioning is off but can be turned on by selection of the caption button to commence captioning. When captioning is on, the button may be back illuminated via a green colored LED. Wen captioning is on but the button cannot be selected to turn captioning off, the button may be back illuminated via a red colored LED or may not be illuminated at all.

In embodiments where a touch screen or other display screen is used to provide a virtual caption controlling button, the virtual button may be removed during the time out period at the beginning of a 911 call or its appearance may be altered during the time out period. For instance, the appearance may follow the white, green and red code described above in conjunction with changing the appearance of a mechanical caption button.

Where a return call is made to an assisted user device after an emergency call is inadvertently or prematurely disconnected, in at least some embodiments, an assisted user device processor may be programmed to maintain a link to a relay operator or call assistant for a time out period (e.g., 1 to 2 minutes) after the initial emergency call is cut off so that captioning can commence immediately upon commencement of a call back call from an emergency operator. Here, captioning may be automatically started again for at least a time out period (e.g. 15 seconds) after the return call commences to avoid any confusion that could occur from an assisted user attempting to select captioning once the return call starts and may continue until de-selected by an assisted user or for the entire duration of an emergency call.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
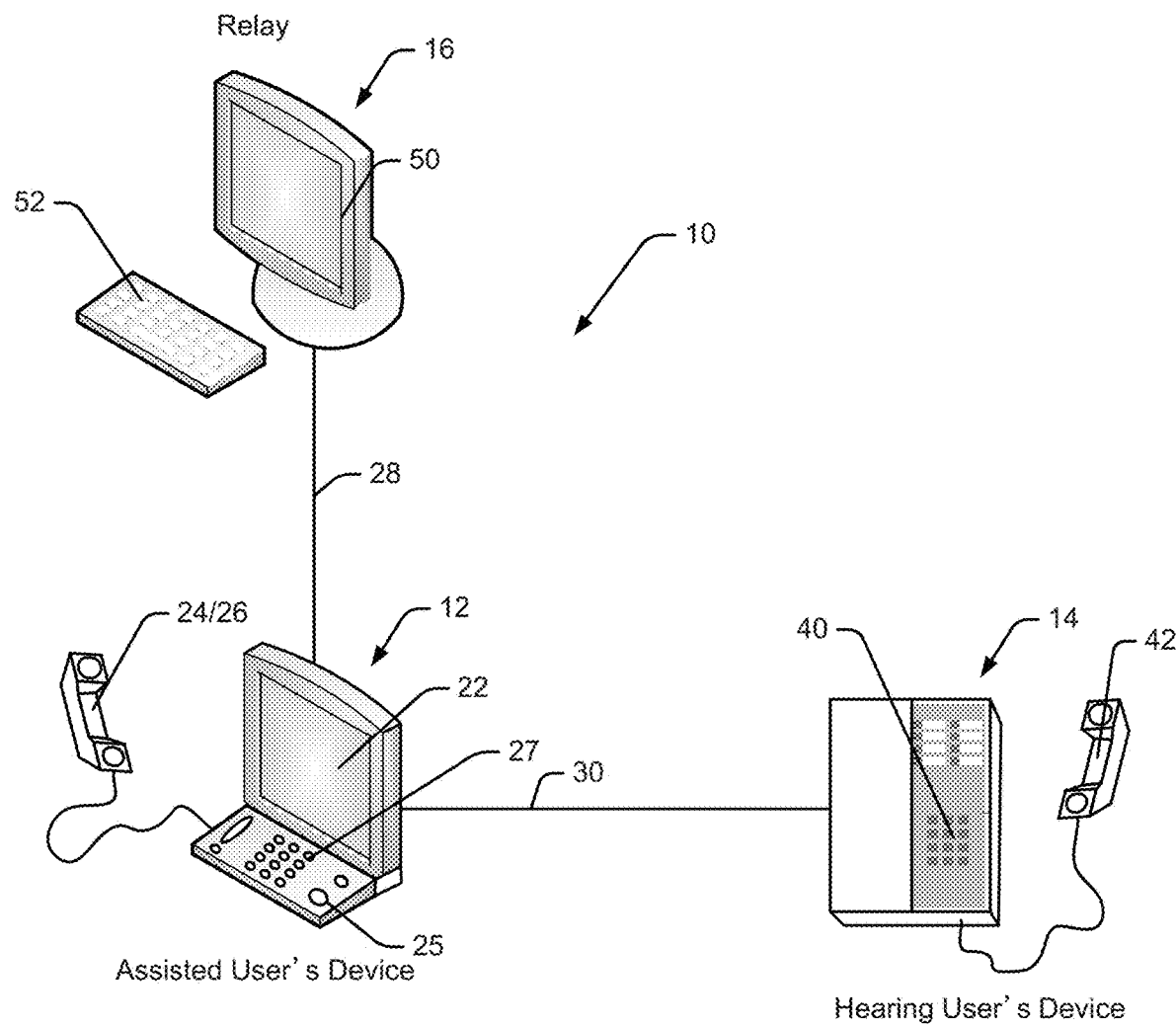
FIG. 1 is a schematic diagram illustrating an exemplary communication system including an assisted user's text captioning device that is consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

Referring now to the drawings wherein like reference numerals correspond to similar elements throughout the several view and, more specifically, referring to FIG. 1, the present invention will be described in the context of an exemplary communication system 10 including, among other components, an assisted user's communication device 12, a hearing user's communication device 14 and a computer or system 16 used by a relay operator to assist an assisted user in communicating with a hearing user. The assisted user's device 12 may be linked via a telephone line 30 to the hearing user's device 14 to facilitate a voice telephone call between an assisted user and a hearing user. To this end, referring also to FIG. 2, an exemplary assisted user device 12 includes a processor 20, a speaker 24, a microphone 26, a keyboard 27 and a telephone link 30. In at least some embodiments, as shown in FIG. 1, the speaker and microphone 24 and 26, respectively, may be provided in a conventional telephone handset that an assisted user can hold up to the user's ear and mouth during communication.

Referring again to FIG. 1, the exemplary hearing user's device 14 is shown as a telephone including a keyboard 40 and a handset 42 that would include, among other components, a speaker and a microphone that are not separately labeled. In other embodiments, the hearing user's device may include other types of communication devices such as, for instance, a cellular telephone, a smart phone, or any other type of telephone or communication device. The telephone link 30 shown in FIGS. 1 and 2 may be a conventional telephone line or any other type of communication link including but not limited to the internet, another network connection, a wireless connection, etc. To place a call from the assisted user's device 12 to the hearing user's device 14, an assisted user may pick up the handset 24/26 and simply dial a telephone number associated with the hearing user's device 14 using keyboard 27. During a voice communication with a hearing user, the assisted user's voice is transmitted by device 12 via line 30 to device 14. Similarly, a hearing user's voice is transmitted along line 30 to device 12 and is broadcast via the speaker 24 in the handset of device 12 to the ear of the assisted user.

Figure 2:
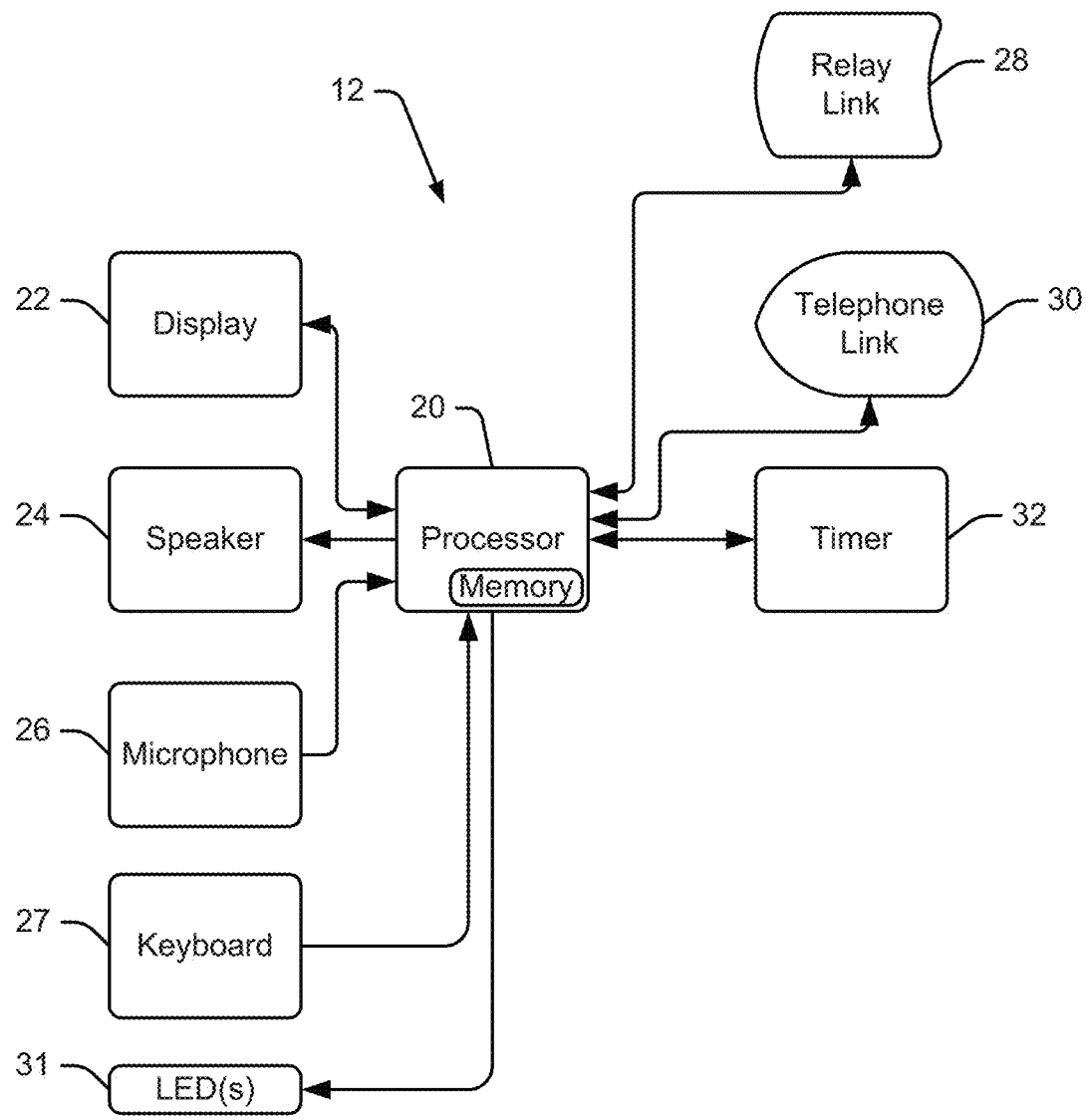
FIG. 2 is a schematic diagram illustrating components of the assisted user's device shown in FIG. 1.
Figure 3:
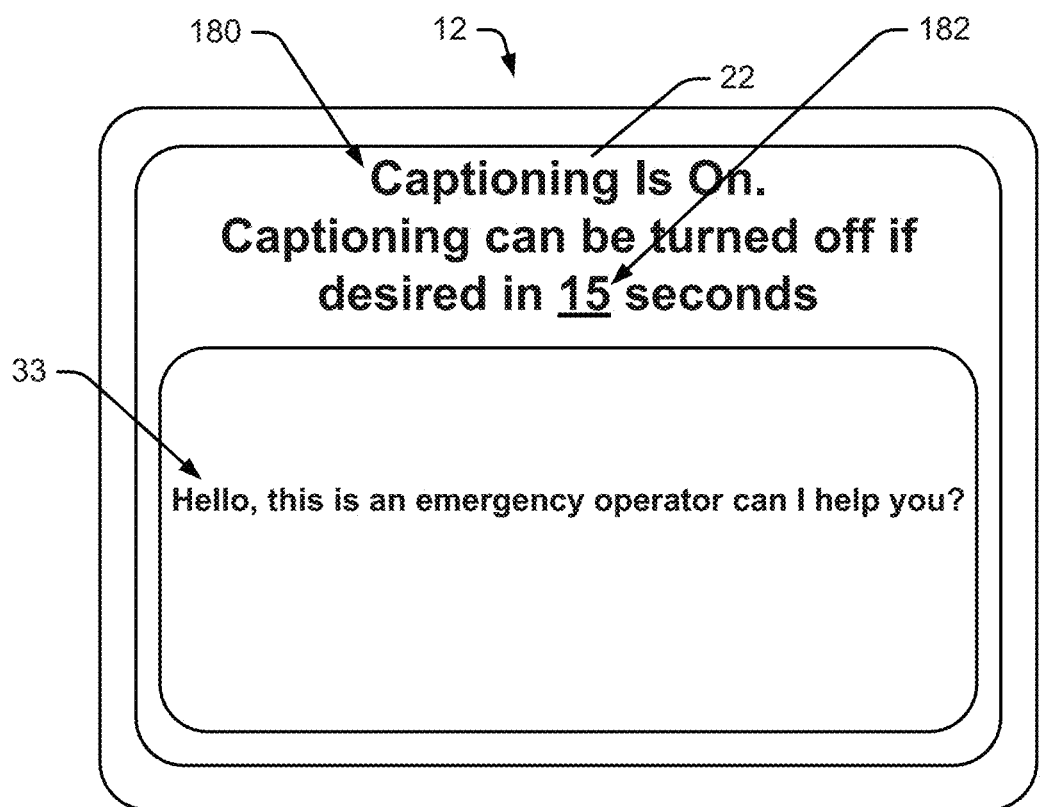
FIG. 3 is a schematic diagram illustrating a display screen and a caption selection button from the assisted user's device in FIG. 1 that is consistent with at least some aspects of the present invention.
Figure 3:
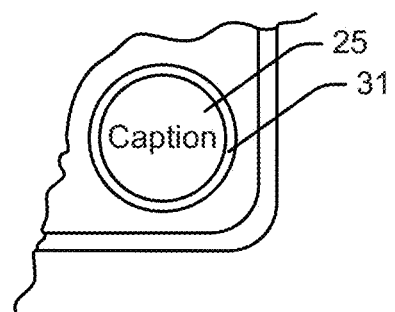

When an assisted user has difficulty hearing voice messages broadcast via speaker 24 from the hearing user, the assisted user can initiate a captioning service whereby the voice messages of the hearing user are transcribed into text and presented to the assisted user via the assisted user's device 12 substantially simultaneously with broadcast of the hearing user's voice messages. To this end, referring again to FIGS. 1 and 2, assisted user's device 12 also includes a display 22 and a relay link 28. Referring also to FIG. 3, when an assisted user is having difficulty hearing a hearing user's voice messages, the assisted user can select a caption button 25 or other type of control (e.g., a virtual button provided via display 22) on the assisted user's device 12. When caption button 25 is selected, processor 20 in the assisted user's device 12 connects via link 28 to the relay 16 and provides the hearing user's voice messages to the relay 16. The link 28 may be any type of link including a conventional telephone line, an internet or other network type link, a wireless link, etc.

At the relay 16, the hearing user's voice messages are transcribed into text and the text is transmitted back to the assisted user's device 12 via link 28 or a third communication link and the transcribed text is presented to the assisted user via display 22. To this end, see FIG. 3 where exemplary transcribed text 33 is shown. The voice to text conversion or transcription at relay 16 may be automated, partially automated or facilitated via a call assistant that listens to the hearing user's voice messages and either types or revoices or both types and revoices the voice messages to transcribe the text as known in the art.

Referring again to FIG. 2, in at least some embodiments of the present invention, when the assisted user device 12 is used to initiate an emergency call by dialing 911 or some other emergency telephone number, the captioning service may be automatically and immediately initiated instead of requiring an affirmative selection of the captioning service by the assisted user in order to expedite the emergency call. Here, in at least some embodiments, an assisted user may be prohibited from turning off the automated captioning for at least a short timeout period (e.g., 15 seconds, 30 seconds, etc.) in order to avoid assisted user confusion. To this end, referring yet again to FIG. 2, a timer 32 is linked to processor 20 for timing out a time out period. While timer 32 is shown as a separate component in FIG. 2, it should be appreciated that the timer 32 may be provided via software stored in a processor memory or via some type of processor timer hardware.

Where captioning is automatically turned on when an emergency call is initiated, the processor 20 may also be programmed to provide some type indication to an assisted user that captioning has been automatically turned on. To this end, as shown in FIG. 2 and also FIG. 3, one or more LEDs or other light emitting devices 31 may be provided for illuminating or otherwise visually distinguishing the caption selection button 25 to indicate automated captioning. For instance, when captioning is turned on, button 25 may be back illuminated via a green LED. When captioning is on and cannot be turned off turning the timeout period, a red LED may be used to back illuminate the caption button 25. Here, green illumination may indicate captioning has automatically been turned on but that captioning can be turned off, for instance, after a timeout period elapses. A white LED may illuminate button 25 when captioning is off but can be turned on manually by and assisted user selecting button 25.

In other embodiments, referring to FIG. 3, a text message may be provided via display screen 22 when captioning is automatically turned on. For instance, in FIG. 3, the text "Captioning is on" 180 is shown in large bold letters to indicate, upon initiation of an emergency call, that captioning has automatically been turned on. In addition, in at least some embodiments, other information such as instructions that captioning may be turned off if desired at a specific time (see 182 in FIG. 3) may be provided via display 22.

Figure 4:
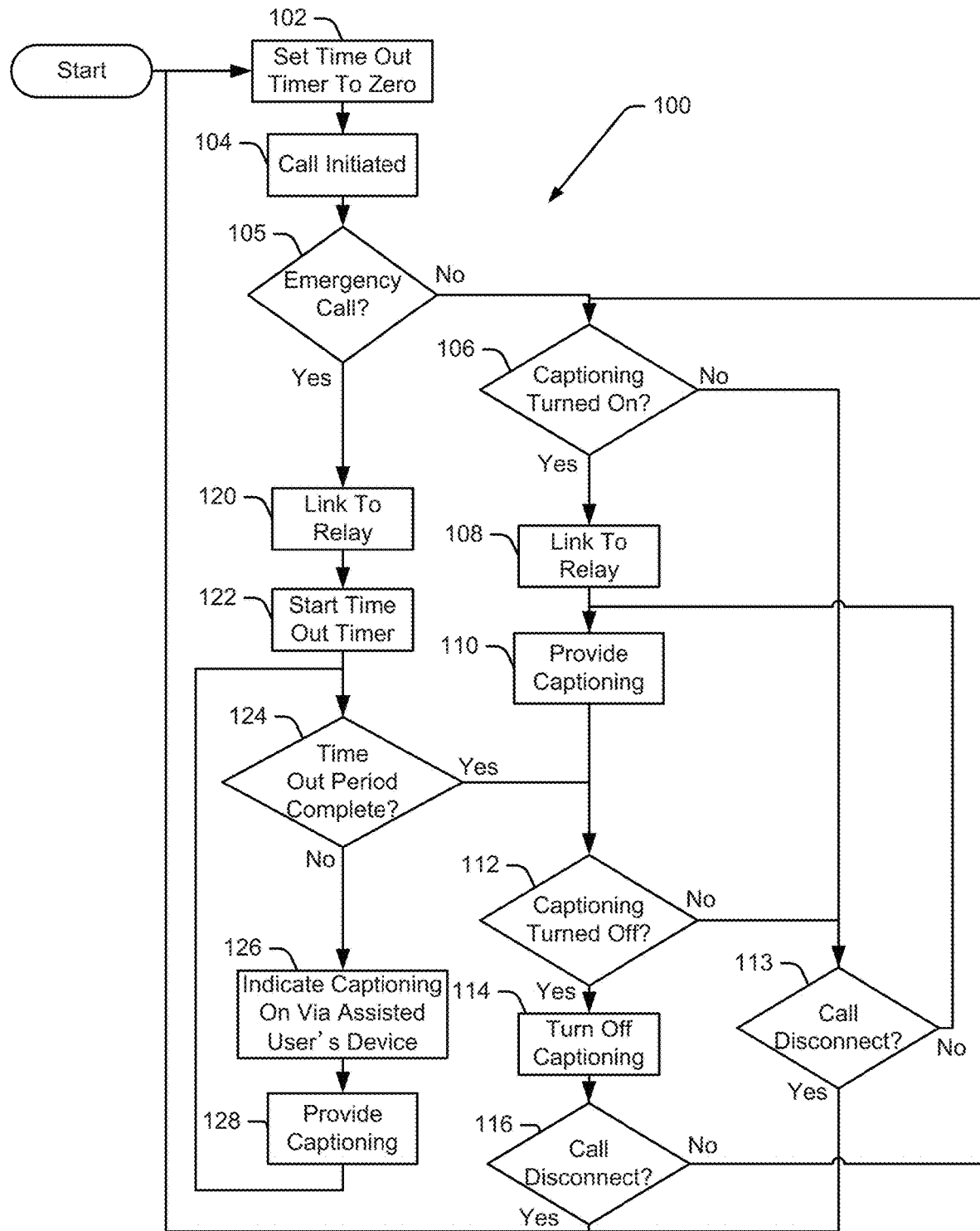
FIG. 4 is a process that may be performed by the processor shown in FIG. 2 to maintain automated captioning upon initiation of an emergency call.

Referring now to FIG. 4, a method 100 that may be performed by processor 20 in FIG. 2 is shown. Referring also go FIGS. 1-3, at process block 102, processor 20 sets a timeout timer to zero. Here, unless indicated otherwise, it will be assumed that a timeout period has been set to 15 seconds. At process block 104, an assisted user uses device 12 to initiate a telephone call to some hearing user. At decision block 105, processor 20 determines whether or not the initiated call is an emergency call. To this end, in at least some embodiments, processor 20 may determine whether or not the assisted user has dialed "911" to initiate an emergency call.

Where the assisted user has not initiated an emergency call, control passes to decision block 106 where device 12 operates to facilitate an non-emergency communication with a hearing user using the called device 14. In this regard, at block 106, processor 20 determines whether or not captioning has been turned on. If captioning has not been turned on, control passes down to block 116 where processor 20 monitors for disconnection of the call. Where the call is disconnected, control passes back up to block 102 where the process continues to cycle. At block 116, if the call has not been disconnected, control passes back up to block 106 where processor 20 continues to monitor for selection of the caption button 25 (see again FIG. 3).

Referring still to FIG. 4, at block 106, if captioning is manually turned on by selection of button 25, control passes down to block 108 where processor 20 links to relay 16 and captioning is provided at block 110. At block 112, processor 20 monitors for selection of button 25 indicating that captioning should be turned off. If button 25 is not selected at block 112, control passes to block 113 where processor 20 determines whether or not the call has been disconnected. Where the call is not disconnected, control passes back up to block 110 where captioning is continually provided. If the call is disconnected at block 113, control passes back up to block 102 where the process described above and hereafter continues to cycle. At block 112, if captioning is turned off, control passes to block 114 where processor 20 disconnects from relay 16 so that captioning ceases after which control passes to block 116.

Referring still to FIG. 4, at block 105, if the initiated call is an emergency call, control passes to block 120 where a link to relay 16 is automatically initiated. At block 122 processor 20 starts the timeout timer. At block 124, processor 20 determines whether or not the timeout period is completed. Where the timeout period (e.g., 15 second in the present example) is completed, control passes from block 124 to block 112 where the subprocess starting at block 112 described above occurs. At block 124, if the timeout period has not lapsed, control passes to block 126 where processor 20 provides some indication to the assisted user that captioning is already turned on via the assisted user's device 12. To this end, see again FIG. 3 where caption button 25 may be illuminated or some message 180, 182, may be provided via display 22 to indicate that captioning is on. Continuing, after block 126, at block 128, captioning is automatically provided via the assisted user's device display 22. After block 128, control loops back up to block 124 where processor 20 continues to monitor the timeout period.

In some embodiments, instead of providing a timeout period after which an assisted user can turn off captioning, captioning may remain on during all 911 or other emergency calls. In addition, when an emergency call is disconnected, in at least some embodiments, an assisted user's device 12 may be programmed to stay in an automated captioning state for some timeout period after disconnection such that if the assisted user's device 12 receives any incoming phone call during the timeout period, captioning is automatically initiated. Here, for instance, if an emergency call is disconnected for some reason and an emergency operator places a return call to an assisted user's device 12 within the timeout period and the assisted user answers the returned call, captioning would be initiated automatically. In at least some embodiments, when captioning is initiated automatically upon reception of a returned call, one or more indications may be presented to the assisted user via the assisted user's device indicating the automated captioning state as shown in FIG. 3.

Figure 5:
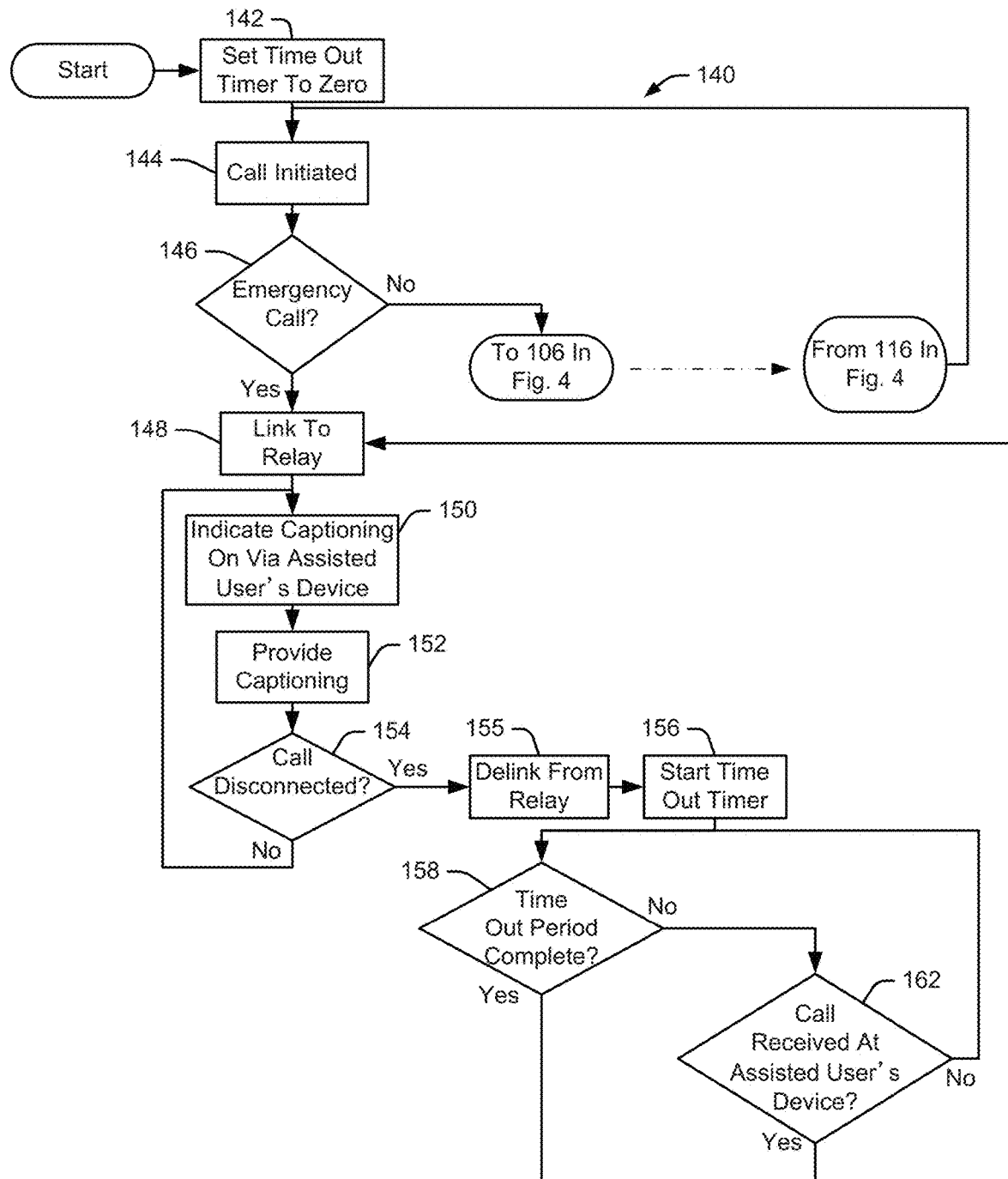
FIG. 5 is a is a process that may be performed by the processor shown in FIG. 2 to initiate automated captioning upon call back to an assisted user after an emergency call has been disconnected.

Referring now to FIG. 5, an exemplary process 140 for automatically initiating captioning upon a return call during a timeout period subsequent to disconnection of an emergency call is illustrated. Referring also to FIGS. 1-3, at block 142, the assisted user's device processor 20 sets a timeout timer to zero. At block 144, an assisted user uses device 12 to initiate a call to another party using hearing user's device 14. At block 146, processor 20 determines whether or not the initiated call is an emergency call. Where the call is not an emergency call, control passes to block 106 in FIG. 4 where the process described above between blocks 106 and 116 occurs. At block 146, where the initiated call is an emergency call, control passes to block 148 where assisted user's device 12 initiates the link on line 28 to relay 16. At block 150, processor 20 indicates that captioning has been automatically turned on via some indication (see again FIG. 3) on the assisted user's device.

At block 152, relay 16 and processor 20 provide captioning to the assisted user via display 22. At block 154, processor 20 monitors for disconnection of the call. Where the call is not disconnected, control passes back up to block 150 where the subprocess including blocks 150, 152, and 154 continues to cycle.

Referring still to FIGS. 1-3 and FIG. 5, at block 154, if the emergency call is disconnected, control passes to block 155 where device 12 delinks from relay 16. At block 156 processor 20 starts a timeout timer. Here, the timeout timer may be substantially longer than the timeout timer described above with respect to FIG. 4. For instance, in at least some embodiments, the timeout timer may time out a period of 30 seconds or greater. In some particularly advantageous embodiments, the timeout timer may have a time out period of between 1 minute and 2 minutes in the process 140 described with respect to FIG. 5.

At block 158, the processor 20 determines whether or not the timeout period has been completed. Where the timeout period has been completed, control passes back up to block 142 where the process described above continues to cycle. If the timeout period has not been completed at block 158, control passes to block 160 where processor 20 determines whether or not a call has been received at the assisted user's device 12. At block 160, when a call has not been received at the assisted user's device within the timeout period, control passes back up to block 158. At block 160, if a call is received at the assisted user's device prior to the timeout period timing out, control passes back up to block 148 where the link to the relay is again established and the process continues to cycle as described above.

In at least some embodiments, when an emergency call is disconnected, in addition to initiating the timeout period at block 156, the link to the relay 16 may be maintained until the timeout period has been completed at block 158. By maintain the relay connection, in at least some cases it is possible that recall captioning may be expedited.

While two different processes are described with respect to FIGS. 4 and 5, it should be appreciated that, in at least some embodiments, the processes may be combined so that, upon initiation of an emergency call, captioning is automatically and immediately commenced and continues for a first timeout period (e.g., 15 seconds) during which an assisted user is prohibited from turning off the captioning service and where, upon disconnection of an emergency call, if a recall occurs within a second timeout period (e.g., 2 minutes), captioning is again automatically and immediately initiated upon commencement of the recall connection. Other machinations of this combination are contemplated. For example, if automated captioning is turned off during an emergency call, the process by which automated captioning is turned on upon initiation of a recall may not occur. In the alternative, automated captioning may be facilitated upon any emergency call or an associated recall after an emergency call has been disconnected regardless of whether or not an assisted user has turned off captioning during an initial emergency call.

Instead of prohibiting an assisted user from stopping captioning, in some embodiments the device 12 processor 20 may instead be programmed to automatically re-link and restart captioning automatically during a time out period or at any time during an emergency call when an assisted user selects a caption button (e.g., see again 25 in FIG. 3). By re-linking and restarting captioning immediately during an emergency call upon selection of the caption button, the processor 20 automatically re-links and starts captioning, albeit with a different call assistant. This is important because there are times when an assisted user may want to use a different call assistance as a function of the perceived quality of captioning. By automatically restarting captioning with a different call assistant a user preference for a different call assistant can be accommodated while still avoiding confusion for an assisted user from discontinuing captioning during an emergency call.

In at least some embodiments it is contemplated that when an emergency operator calls an assisted user's device 12 after disconnection of a call, the relay operators system may be able to indicate to device 12 that the calling device is associated with an emergency operator. Here, instead of timing out a time out period after a disconnection occurs, device 12 may always monitor calls for an emergency indication and may be programmed to automatically start captioning when an emergency call back call is received and identified.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims.

What is claimed is:

1. An assisted user's (AU's) captioning device for assisting an AU during a call with a hearing user (HU) wherein the hearing user uses a HU's communication device, the captioning device comprising:
   a display screen; and
   a processor linked to the display screen, the processor programmed to perform the steps of:
   (i) upon receiving a call within a first time period, automatically initiating captioning and presenting captions of an HU voice signal during at least a portion of the call; and
   (iii) upon determining that a call is received outside the first time period, starting the call without captioning and providing an option to the AU to initiate captioning during the call.

2. The captioning device of claim 1 wherein the step of initiating captioning includes receiving HU voice signal from the HU's communication device and transmitting the HU voice signal to a remote captioning relay.

3. The captioning device of claim 2 wherein the step of presenting captions includes receiving captions back from the remote relay and presenting the received captions via the display screen.

4. The captioning device of claim 1 wherein the step of providing an option includes providing a touch selectable option button via the display screen.

5. The captioning device of claim 1 wherein the step of presenting captions during at least a portion of the call includes presenting the captions for the duration of a timeout period after the call commences wherein the AU is prohibited from terminating captioning for at least the duration for the timeout period.

6. The captioning device of claim 5 wherein, during the timeout period, the captioning device presents a text message to the AU via the display screen indicating that the caption service is operating and cannot be turned off for the duration of the timeout period.

7. The captioning device of claim 6 wherein the text message includes a countdown clock to count down the duration of the timeout period during which the caption service is operational and cannot be turned off.

8. The captioning device of claim 7 wherein, after the timeout period ends, the processor is programmed to present a caption off button wherein, prior to selection of the caption off button, HU voice signal captioning continues and the captions associated therewith are presented via the display screen and wherein, subsequent to selection of the caption off button, captioning ceases.

9. The captioning device of claim 5 wherein the timeout period is less than two minutes seconds.

10. The captioning device of claim 1 wherein the processor is further programmed to, prior to receiving the call within the first time period, facilitate a prior call between the AU communication device and an HU communication device wherein HU voice signal captioning was occurring when the prior call was disconnected, and wherein the first time period is a time period immediately following disconnection of the prior call.

11. The captioning device of claim 1 wherein the processor is further programmed to, prior to receiving the call within the first time period, facilitate a prior call between the AU communication device and an emergency operator wherein voice signal form the emergency operator was being captioned when the prior call was disconnected, and wherein the first time period is a time period immediately following disconnection of the prior call.

12. An assisted user's (AU's) captioning device for assisting an AU during a call with a hearing user (HU) wherein the hearing user uses a HU's communication device, the captioning device comprising:
   a display screen; and
   a processor linked to the display screen, the processor programmed to perform the steps of:
   (i) upon receiving a call within a first time period, automatically initiating captioning and presenting captions of an HU voice signal during at least a portion of the call via the display screen wherein the AU is prohibited from discontinuing the captioning and presenting processes for at least the duration of a timeout period after the call is received; and
   (iii) upon determining that a call is received outside the first time period, starting the call without captioning.

13. The captioning device of claim 12 further including, upon determining that the call is received outside the first time period, providing an option to the AU via the captioning device to initiate captioning during the call.

14. The captioning device of claim 12 further including presenting a text message via the display screen and during the time out period indicating that captioning cannot be turned off for the duration of the timeout period.

15. The captioning system of claim 12 further including presenting a count down clock via the display screen counting down the time remaining during the duration of the time out period.

* * * * *